Patented Oct. 29, 1935

2,018,760

UNITED STATES PATENT OFFICE 2,018,760

CATALYST FOR AMMONIA OXIDATION AND THE LIKE

George M. Hickey, Paoli, Pa., assignor to J. Bishop & Co. Platinum Works, Malvern, Pa., a corporation of Pennsylvania No Drawing. Application October 29, 1930, Serial No. 492,104

9 Claims. (Cl. 23—234)

This invention relates to a catalyst for ammonia oxidation and the like, and one of its primary objects is to provide a catalyst which has a greatly improved conversion efficiency.

Another object of the invention is to provide a catalyst which will become fully activated in a very short period of time.

I have heretofore suggested the use of a catalyst comprising platinum alloyed with rhodium. The rhodium has been used in substantial percentages by weight.

I have discovered, however, that the percentage of rhodium employed plays an important part with respect to conversion efficiency and more particularly I have found that percentage of rhodium should be less than two percent, the best results being obtained with 1.66% of rhodium by weight.

By employing this preferred percentage I have been enabled to obtain as high as 99.2% conversion efficiency (total ammonia oxidized) with 97.5% conversion to nitric oxide. A platinum catalyst gives about 92% to 93% efficiency, and the ordinary platinum rhodium alloy in use gives an efficiency somewhat higher. While the increase in percentage obtained by using materially less than two percent of rhodium appears to be small, nevertheless it will be understood by those skilled in the art that this represents in fact a very substantial increase because of the close approach to the theoretical.

The catalysts are usually in the form of a wire gauze through which a mixture of ammonia and oxygen containing gas is passed.

I have found by annealing the wire that I am enabled to materially cut down the time required before the gauze becomes fully activated. I prefer to anneal to about 2000 degrees Fahrenheit for about one-half hour.

To further increase the rate of activation of the gauze I subject the annealed wire to an acid wash, hydrochloric acid being preferred.

The foregoing treatment of annealing and acid washing results in full activation in less than three hours as against ten to twenty-four hours required for the catalysts now employed for the purpose.

It is possible to replace the rhodium in whole or in part by cobalt if a maximum conversion efficiency is not desired. The cobalt should preferably be used, however, in larger proportions than the rhodium. For example, if the rhodium is to be entirely replaced by cobalt, the alloy should contain about 4% of cobalt by weight.

The cobalt increases the strength and makes it possible to use an extremely fine wire. It also seems to give a smaller crystal structure presenting more surface area for sprouting.

I claim:—

1. As a new article of manufacture, a catalytic gauze for ammonia oxidation and the like comprising an alloy of platinum, rhodium and cobalt, annealed and acid washed.

2. As a new article of manufacture, a catalytic gauze for ammonia oxidation and the like comprising an alloy of platinum, rhodium and cobalt, annealed to a temperature of approximately 2000° F. and acid washed.

3. As a new article of manufacture, a catalytic gauze for ammonia oxidation and the like comprising an alloy of platinum, rhodium and cobalt, acid washed.

4. The method of manufacturing a catalyst which includes preparing an alloy of platinum, rhodium and cobalt, forming a catalytic gauze from said alloy, and annealing the formed gauze at a temperature in the neighborhood of 2000° F.

5. The method of manufacturing a catalyst which includes preparing an alloy of platinum, rhodium and cobalt, forming a catalytic gauze from said alloy, annealing the formed gauze at a temperature in the neighborhood of 2000° F., and washing the formed and annealed gauze with acid.

6. The method of manufacturing a catalyst which includes preparing an alloy of platinum, rhodium and cobalt, forming a catalytic gauze from said alloy, and washing the formed gauze with acid.

7. The method of manufacturing a catalyst which includes preparing an alloy of platinum and rhodium, forming a catalytic gauze from said alloy, and annealing the formed gauze, to prepare it for catalytic reaction, by heat treatment at a temperature in the neighborhood of 2000° F.

8. As a new article of manufacture, a catalytic gauze for ammonia oxidation and the like comprising an alloy of platinum, rhodium and cobalt, the rhodium and cobalt together constituting substantially less than 2% of the alloy by weight.

9. A catalytic gauze constructed of an alloy comprising platinum in major proportion, and containing small amounts of rhodium and cobalt, the combined content of the rhodium and cobalt being not less than 0.25% and not greater than 4% of the alloy.

GEORGE M. HICKEY.